No. 639,828. Patented Dec. 26, 1899.
L. P. ROLLINS.
ROLLER BEARING AXLE BOX FOR WHEELS.
(Application filed Apr. 4, 1899.)
(No Model.)
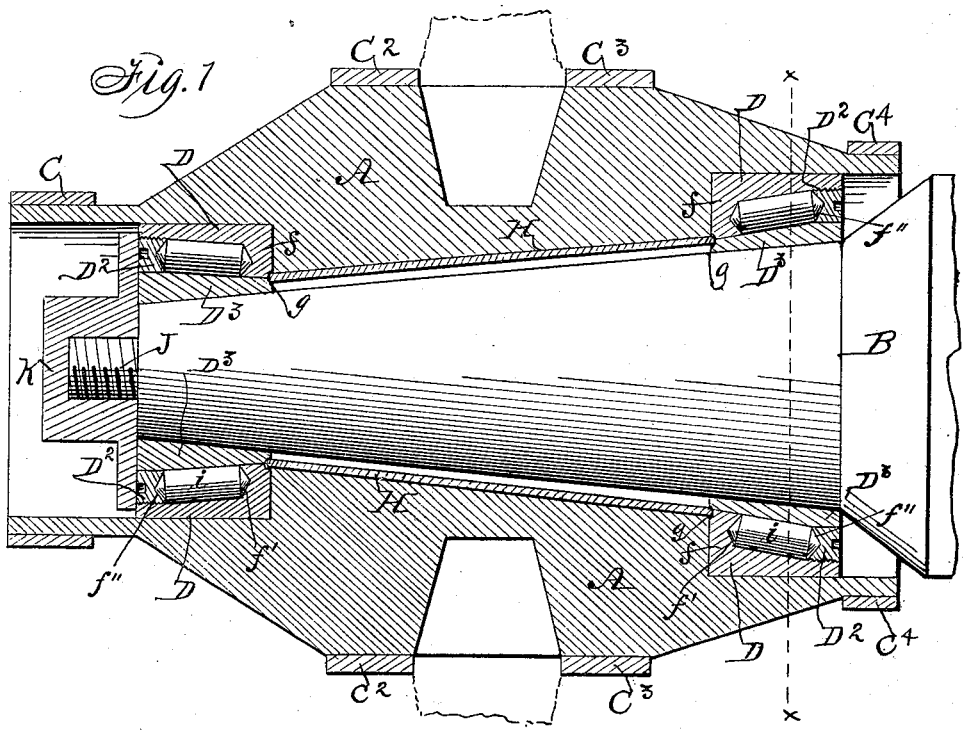
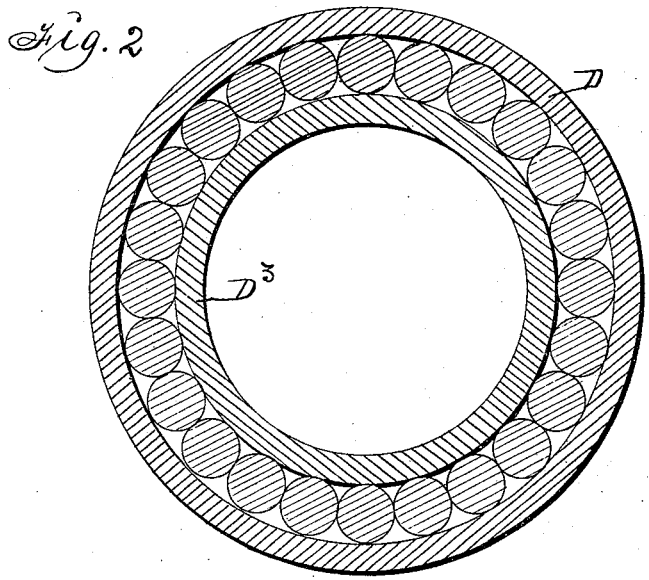
Witnesses:
J. B. Davis
F. E. Holben
Inventor:
Lewis Prescott Rollins

UNITED STATES PATENT OFFICE.

LEWIS P. ROLLINS, OF PRESCOTT, IOWA.

ROLLER-BEARING AXLE-BOX FOR WHEELS.

SPECIFICATION forming part of Letters Patent No. 639,828, dated December 26, 1899.

Application filed April 4, 1899. Serial No. 711,680. (No model.)

*To all whom it may concern:*

Be it known that I, LEWIS P. ROLLINS, a citizen of the United States of America, residing at Prescott, in the county of Adams and State of Iowa, have invented a Roller-Bearing Axle-Box for Wheels, of which the following is a specification.

My object is to reduce the friction and wear of the hub of a wheel upon the axle arm or journal upon which the hub and wheel revolve and to provide an annular chamber extending from nearly one end of the hub to the other for the reception and confinement of a large supply of axle-grease.

My invention consists in the construction, arrangement, and combination of separable parts of a roller-bearing box and a plurality of rollers at each end portion of the hub, as hereinafter set forth, pointed out in my claims, and illustrated in the accompanying drawings, in which—

Figure 1 is a longitudinal sectional view of a hub on the arm of an axle, and shows the positions of the rollers relative to the hub and axle. Fig. 2 is a transverse enlarged sectional view of the metal boxing on the line $x\ x$ of Fig. 1, showing one of the annular chambers filled with rollers.

The letter A designates a wooden hub, and B a metal axle.

$C, C^2, C^3$, and $C^4$ are metal rings fixed around the hub.

D is a member of the roller-bearing metal boxing fitted into an annular cavity at the rear end of the hub and in concentric position with the axis of the arm of the axle and the center of the hub. It has a continuous internal flange $f$ at its inner end and a continuous groove $f'$ in the inside face, adapted to serve as a bearing for the conical ends of rollers, and an internal screw-thread at its outer end.

$D^2$ is a mating member of the part of the boxing and has an external screw-thread at its outer end to engage the internal screw-thread of the part D. It also has a continuous groove $f''$ in its inside face to receive the conical ends of a plurality of rollers $i$, that are fitted in the roller-bearing boxing.

$D^3$ is a ring that is wedge-shaped in longitudinal section and fitted to the inner face of the flange $f$ of the part D and the inner face of the part $D^2$ and adapted in size to fit the rear end portion of the arm of the axle, as shown in Fig. 1. Perforations in the outer face of the part $D^2$ are designed to admit the ends of a spanner-wrench for the purpose of screwing the part $D^2$ in and out of the part D. Annular grooves $g$ at the inner faces and junction of the parts D and $D^2$ are designed to admit the inner end of a cylindrical metal casing H, that is fitted to the bore of the hub A in such a manner that it will not come in contact with the arm of the axle B and produce an annular oil-tight chamber between the hub and the end or arm of the axle.

The metal roller-bearing boxing in the front end of the hub is composed of parts that are the same in form as those described in the rear end, but smaller in diameter, as required, to fit the smaller and outer ends of the hub and the arm of the axle that terminates in a screw J, to which is fitted a nut K, that overlies the outer faces of the parts D, $D^2$, and $D^3$ and retains all the parts of the complete metal boxing united in place within the hub, as required for practical use.

In operation the rings or parts $D^3$, that are wedged fast to the arm of a metal axle or metal skein on a wooden, will bear upon the rollers in the annular chamber between the mating members of the boxing that incloses the rollers, as required, to reduce the minimum friction and wear.

Having thus described the construction and arrangement and combination of all the parts, the operation and utility of my invention will be understood by persons familiar with the art to which it pertains, and

What I therefore claim as new, and desire to secure by Letters Patent therefor, is—

1. In a hub for wheels, a roller-bearing comprising a metal ring-shaped member that has an internal continuous flange at one end, a continuous groove in the inside face of the flange, and an internal screw-thread at its other end, a mating member having an external screw-thread to engage the said internal screw-thread and a continuous groove in its inner face and a plurality of rollers fitted in said grooves and the annular chambers produced by the combination of the said three distinct parts, for the purposes stated.

2. A hub for wheels comprising a roller-bearing boxing at each end portion consisting of three distinct metal parts, to wit, a ring-shaped part fitted in an annular cavity in the hub and having an internal flange at its inner end and a continuous groove in the inner face of the flange and an internal screw-thread at its outer end, a mating member having an external screw-thread to engage said internal screw-thread and a continuous groove in the inside face of the mating member and a ring that is wedge-shaped in longitudinal section and a metal cylinder fitted at its ends into continuous annular grooves in the inner faces of the boxes and rollers in the boxings, all arranged and combined to operate in the manner set forth for the purposes stated.

3. A hub for wheels comprising a roller-bearing boxing at each end portion consisting of three distinct metal parts, to wit, a ring-shaped part fitted in an annular cavity in the hub and having an internal flange at its inner end and a continuous groove in the inner face of the flange and an internal screw-thread at its outer end, a mating member having an external screw-thread to engage said internal screw-thread and a continuous groove in the inside face of the mating member and a ring that is wedge-shaped in longitudinal section and a metal cylinder fitted at its ends into continuous annular grooves in the inner faces of boxes and rollers in the boxings, in combination with an axle having an arm that terminates in a screw-thread and a nut fitted to the screw-thread, to operate in the manner set forth for the purposes stated.

LEWIS P. ROLLINS.

Witnesses:
J. B. DAVIS,
F. E. HOLBEN.